F. E. BRIGHT.
SEPARATOR FOR ANTIFRICTION BEARINGS.
APPLICATION FILED JUNE 9, 1908.
956,676.
Patented May 3, 1910.
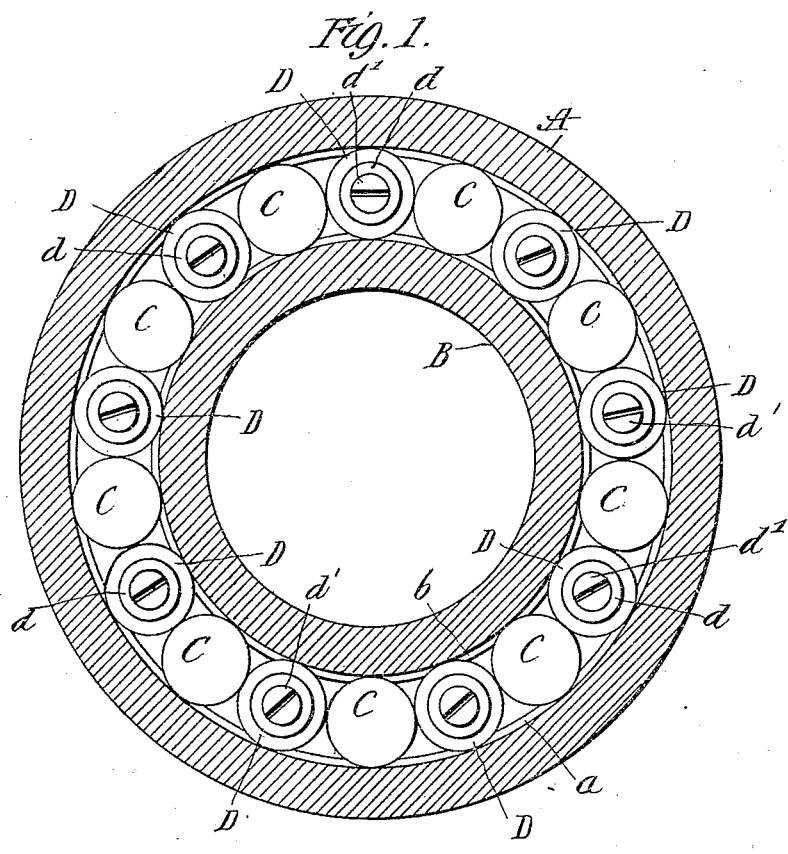
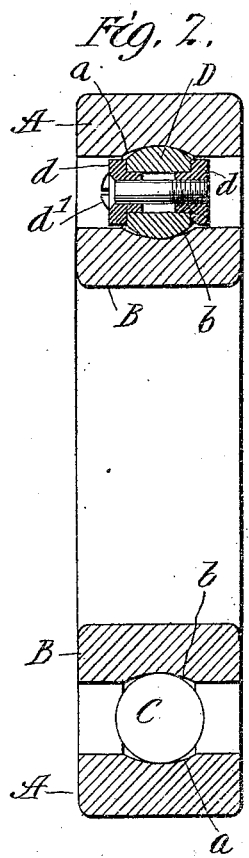
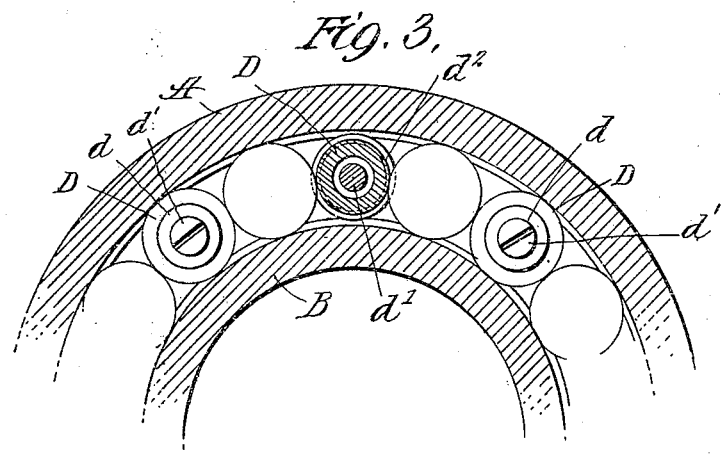
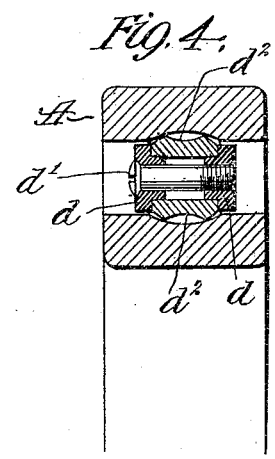
Witnesses:
Inventor:
F. E. BRIGHT,
By his Attorney

UNITED STATES PATENT OFFICE.

FRED EUGENE BRIGHT, OF PHILADELPHIA, PENNSYLVANIA.

SEPARATOR FOR ANTIFRICTION-BEARINGS.

956,676.     Specification of Letters Patent.     Patented May 3, 1910.

Application filed June 9, 1908. Serial No. 437,546.

*To all whom it may concern:*

Be it known that I, FRED EUGENE BRIGHT, a citizen of the United States, residing at Philadelphia, in the county of Philadelphia and State of Pennsylvania, have invented certain new and useful Improvements in Separators for Antifriction - Bearings, of which the following is a specification, reference being had therein to the accompanying drawing.

My invention relates to separators for anti-friction bearings, that is to say to such separators as are ordinarily employed between the balls or other rolling members thereof.

Broadly speaking the separator consists of a separating element proper and a lateral retaining element connected thereto. Such a separator may be employed in various forms and many constructions without departing from the spirit of the invention. For the purpose of illustration I have shown it as applied to the well known bearing of the Conrad type, such for instance as is set forth in the United States Letters Patent to R. Conrad, No. 838,303, December 11th, 1906, wherein the inner and outer rings of the bearing are provided with a continuous and uninterrupted raceway. I do not desire however to limit my invention to this type of bearing, as it is obvious that it may be applied to many different forms.

Referring to the drawing: Figure 1 is a transverse section of the bearing with my improved separator applied thereto. Fig. 2 is a transverse section of the same, taken at right angles to that shown in Fig. 1; and Figs. 3 and 4 are views substantially similar to Figs. 1 and 2, but illustrating a modification.

As clearly described and illustrated in the Conrad patent previously mentioned, the bearing is assembled by the eccentric displacement of the rings and the insertion of the balls into the raceway. The rings are then restored to their normal positions and the balls are distributed and held in place by separators which are laterally inserted between the adjacent balls. These several parts are shown in the drawing and consist of the outer and inner rings A and B, formed respectively with the grooves or channels $a$ and $b$, which together constitute the raceway for the balls C. The balls C are held apart by the separators. Each of these separators comprises a spherically-formed element D of such shape and size as to enable it to travel in the raceway. The separating element is formed with flat sides or edges and is of a width less than the normal distance between the rings A and B, so as to permit of its insertion there between. After the element D has been inserted in the manner described, it is turned through an angle of 90°, so as to bring its spherically formed surface into the correspondingly shaped raceway in the rings. In order to secure it in its operative position, I provide it with a lateral retaining element $d$. As shown in the drawing this lateral retaining element $d$ consists of two pieces or flanges, which are connected together and to the separator D by any suitable means such as the screw $d^1$.

It will be seen that the two parts of the retaining element $d$ are somewhat less in width than the distance between the rings A and B, and therefore do not travel in contact therewith, thus reducing the frictional resistance to a minimum. They are however located in close proximity to the rings and in such relation thereto that they will resist tendency of the separator D to tilt or to become displaced from its normal operative position to a sufficient extent to permit its escape. I have thus provided a separator which is not only durable and easy of application, but also efficient in practice and not liable to displacement.

While in the drawing the separating element D is shown as of sufficient size to fill the raceway, it is to be understood that its function is to space and separate the rolling elements rather than to assist them in bearing the load; and that accordingly they may be made of any size or diameter without departure from the spirit of my invention.

In Figs. 3 and 4 I have illustrated a modification, wherein the separator is formed with a peripheral groove $d^2$ in the spherical portion. This groove is so shaped as to correspond to the contour of the balls, thus reducing the width of the separator and enabling it to be applied to bearings of smaller pitch circumference.

Having thus described my invention, what I claim and desire to secure by Letters Patent of the United States is as follows:

1. A separator for anti-friction bearings comprising a spherically formed separating element and a lateral retaining element connected thereto, the said retaining element being distinct and independent from the retaining element of any other separator.

2. A separator for anti-friction bearings comprising a spherically formed separating element and a lateral retaining element connected thereto, the said retaining element being distinct and independent from the retaining element of any other separator, and the separating element being formed with a peripheral groove therein.

In testimony whereof I have affixed my signature in presence of two witnesses.

FRED EUGENE BRIGHT.

Witnesses:
    NETTIE L. HAHN,
    J. J. QUINN.